Oct. 25, 1960  A. W. KOLB  2,957,350
PRESSURE TRANSDUCER

Filed July 11, 1955  2 Sheets-Sheet 1

INVENTOR.
AXEL W. KOLB
BY
ATTORNEYS

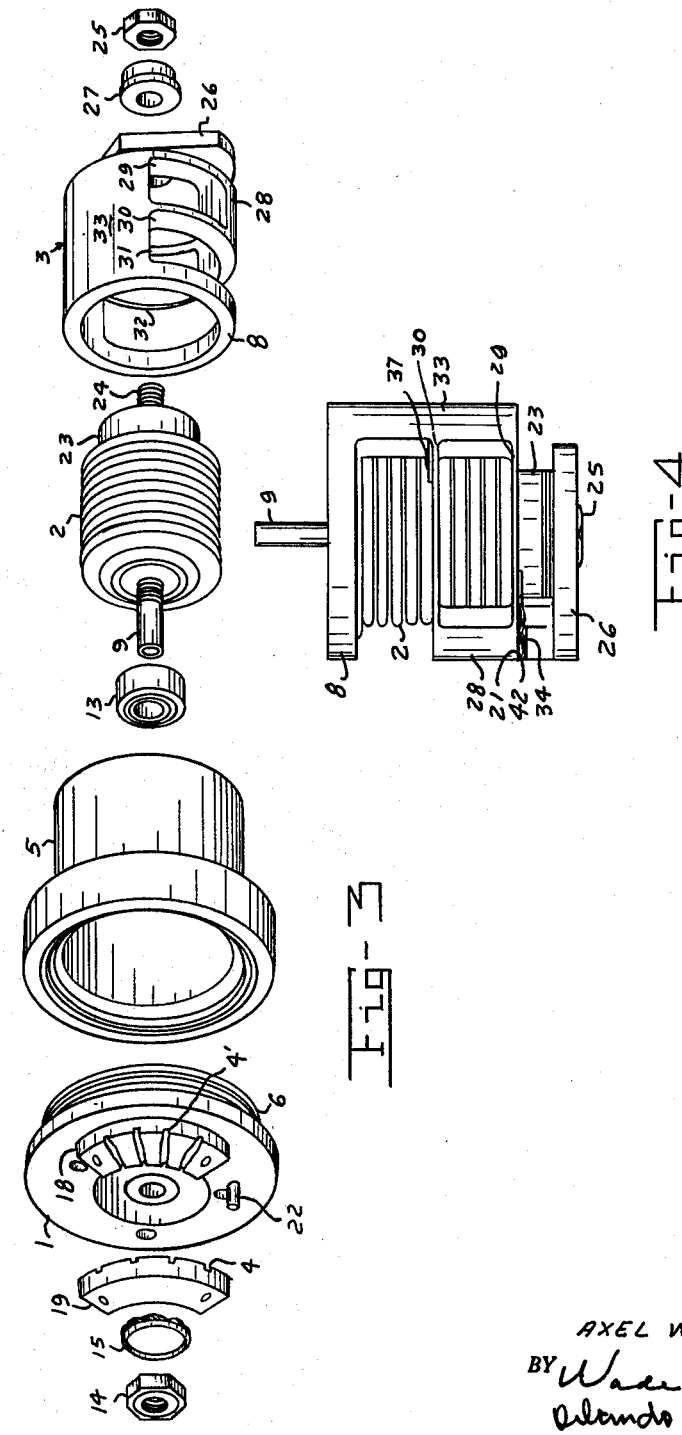

United States Patent Office 2,957,350
Patented Oct. 25, 1960

2,957,350

PRESSURE TRANSDUCER

Axel W. Kolb, Dayton, Ohio, assignor to the United States of America as represented by the Secretary of the Air Force Filed July 11, 1955, Ser. No. 521,426

4 Claims. (Cl. 73—398)

(Granted under Title 35, U.S. Code (1952), sec. 266)

The invention described herein may be manufactured and used by or for the United States Government for governmental purposes without the payment to me of any royalty thereon.

This invention relates to an improved pressure transducer of the strain gauge type.

Pressure transducers of the strain gauge type which have been available heretofore have had limitations which are successfully avoided by the improved device which is disclosed hereby.

The present invention is a new and an improved pressure measuring device of a very high degree of accuracy attributable in part at least to a successful avoidance of off-axis force component losses. The device is of a strong and rugged construction and is adapted for an appreciable variety of applications and uses.

One of the objects of the present invention is to provide a new and an improved strain gauge type of pressure transducer characterized by the highest range of accuracy known.

Another object is to provide an improved pressure measuring instrument which lends itself conveniently to various types of pressure measurements in both ground and airborne instrumentation and testing equipment.

Another object is to provide a pressure measuring instrument applicable to the measurement of model base pressures in wind tunnel instrumentation.

Another object is to provide a pressure measuring instrument which may be used in automatic multiplexing recording systems for the simultaneous recording of pluralities of wind tunnel pressures.

A further object is to provide an improved pressure transducer which can be used directly with modern computing equipment.

Another object is to provide a pressure measuring device which can be duplicated in various sizes for a desired plurality of capacities without changing design.

The above and other objects will be apparent from the following description of a successfully operative embodiment of the present invention as illustrated in the accompanying drawings, wherein:

Fig. 3 is an enlarged exploded view of some parts of the device in Fig. 1 separately shown in perspective;

Fig. 4 is a side elevational view of the bellows and flexure frame member assembly in the device in Fig. 2;

Figure 1:
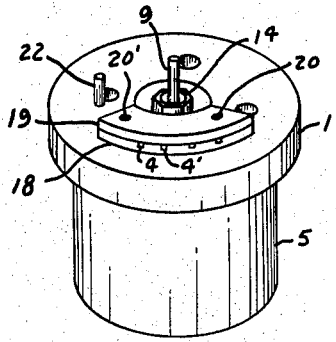
Fig. 1 is an external perspective view of a pressure measuring device which embodies the present invention.

The pressure transducer shown in the accompanying drawings comprises a base plate 1 supporting a bellows 2 within a flexure frame 3 bearing a plurality of wire strain gauges with outlet leads 4, 4', etc. accessible from outside of a case or housing 5.

The base plate 1 has integral therewith an axially projecting ridge or flange 6 externally threaded to engage an inwardly threaded lower rim of the housing 5 in pressure sealed contact by a suitable gasket 7 which is compressed therebetween.

The radially inner face of the base ridge or flange 6 is machined smooth to receive a thick rigid lowest ring part 8 of the flexure frame 3. The base plate is apertured centrally for the positioning therein of a bellows connecting tube 9. The bellows tube 9 is silver soldered at 10 to a hollow stub 11 cupped at its inner end and welded at 12 to the lower end of the bellows 2. A ring 13 is grooved in both of its axial faces for the disposition of gaskets therein to seal its contact with both the base plate 1 and with the hollow cupped part of the stub 11 when a nut 14 over a lock washer 15 is tightened upon the externally threaded shaft of the stub 11 in accomplishing the assembly of the device. The flexure frame ring 8 is secured to the base plate 1 by screws 16, 16', etc.

The ring 8 and the base plate 1 are apertured at 17, 17', etc. for the positioning therein of leads from a plurality of strain gauges mounted on the flexure member and terminating in a two-part electrical terminal block 18 and 19 secured by screws 20 and 20' to the outer face of the base plate 1. Strain gauge leads 4, 4', etc. are available at the terminal block 18 and 19 for the making of solder connections therewith. The base plate 1 also has silver welded therethrough a housing pressure connecting tube 22 leading into the compartment between the bellows 2 and the housing 5.

The end of the bellows 2 which is remote from the weld 12 is welded at 23 to the outer flange of a cup-shaped stub 24 which continues away from the bellows in an externally threaded bolt shaft receiving a securing nut 25 held against rotation by a lock washer or the like as shown, with the nut and lock washer countersunk in a strong and rigid flexure frame arm 26 which is remote from the flexure frame ring 8. An upper spacer ring 27 preferably occupies the cup of the stub 24.

The flexure frame 3 is positioned outwardly of the bellows 2 and inwardly of the housing 5. The flexure frame 3 preferably is machined from a single steel cylinder which is of the same composition as is the bellows 2 and hence has the same coefficient of thermal expansion.

The flexure frame 3 comprises the rigidly stiff arm 26 continuing at its attached end in an equally rigidly stiff segment skirt 28. The flexure frame arm 26 and the skirt 28 are integrally continuous through a desired plurality of relatively flexible beams, illustratively represented by the pairs of beams 29, 30, 31 and 32 on opposite sides of the flexure frame. The flexure frame 3 also comprises at its other end the previously mentioned heavy and stiff ring 8 which continues at its attached end in an equally rigidly stiff segment skirt 33. The flexure frame ring 8 and the skirt 33 also are integrally continuous with the beams 29 to 32, inclusive.

The flexure frame 3 so designed and assembled with the bellows 2 delivers all axial motion derived from the bellows 2 to the flexible beams 29 to 32, inclusive. There is substantially no off-axial force component characterizing the performance of this assembly. Beam distortion preferably is indicated by strain gauges. The strain gauges preferably are applied in pairs cemented to the upper surface of one beam and to the lower surface of the other beam on either side of the flexure member frame 3. In this manner eight strain gauges, numbered 34 to 41, inclusive, in the accompanying drawings, provide a highly accurate indication of any distortion in both magnitude and direction to which the flexure frame 3 beams are subjected.

Figure 5:
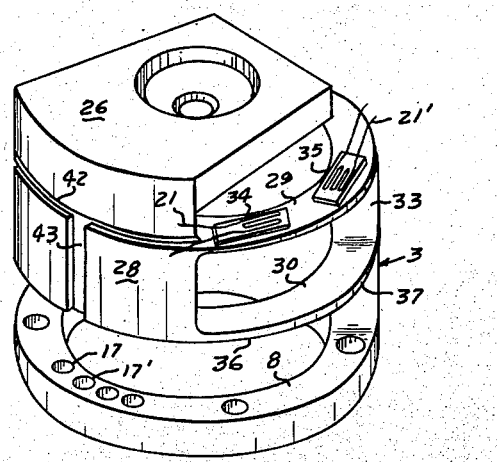
Fig. 5 is a perspective view of the flexure frame member in Fig. 4.
Figure 2:
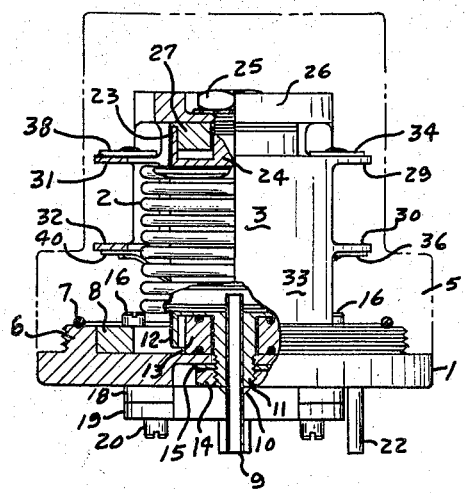
Fig. 2 is an enlarged elevational view, with parts broken away and in section, of the device shown in Fig. 1.
Figure 6:
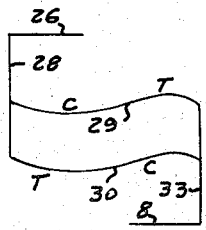
Fig. 6 is a diagram of a preferred flexure frame beam and strain gauge arrangement.

In Fig. 4 of the accompanying drawings the effect in terms of compression and tension exerted on the individual strain gauges by the flexure frame beams accompanying a partial evacuation of the bellows 2 is represented. As indicated in Fig. 5 the members of a pair of strain gauges 34 and 35 secured to the upper face of the flexure frame beam 29 adjacent its opposite ends, are subjected to opposite forces. A force diagram with a partially evacuated bellows 2 is represented in Fig. 6 of the drawings. In Fig. 6 the gauge 34 is subjected to a compression force. The gauge 35 is subjected to a tension force. In a similar manner preferably on the lower face of the beam 30 and adjacent the opposite ends thereof the gauge 36 is subjected to a tension force and the gauge 37 is subjected to a compression force.

Leads from the strain gauges are conducted in pairs along a horizontal groove 42 and a vertical groove 43 in the side 28 of the flexure frame 3 and through holes 17, 17', etc. in the flexure frame ring 8 to the terminal block 18 and 19. The eight pairs of strain gauge leads preferably are combined in four output wires 4, 4', etc. at the terminal block to which solder connections may be made.

The strain gauge ouput terminals preferably in a usual manner are connected as legs in a Wheatstone bridge equipped with a meter and a potential, for obtaining strain gauge readings on the performance of the device. In the bridge circuit it is preferred that leads from two strain gauges under tension are inserted in series as one bridge leg and leads from two strain gauges under compression are inserted in series as an adjacent bridge leg.

The described device in its performance actuates a parallelogram of beams and stresses on the opposite sides of the flexure member 3. The described device is adapted for the measuring of differential pressure between fluids in the range of about three and one-half tons per square inch. One fluid may be introduced through the connection 9 into the interior of the bellows 2. Another fluid may be introduced through the housing connection 22 into the compartment between the bellows 2 and the interior of the housing 5, in which latter compartment the strain gauges are mounted. In the event one of the fluids is a liquid, or is a fluid which might be reactive with or which might adversely affect a strain gauge, its mounting or its function, that fluid should be introduced into the bellows 2 rather than into the compartment between the bellows and the housing.

Absolute pressure may be measured by the device where the fluid at a pressure to be measured is introduced into the bellows 2 through its connection 9 and the housing connection 22 is left open to the ambient atmosphere.

Barometric pressure may be measured by the device where the bellows connection 9 is attached to a pump and the bellows 2 evacuated and where the housing connection 22 is left open to the ambient atmosphere.

It is to be understood that the device and the parts thereof which are disclosed and described herein and the cited uses of the device have been submitted to describe a successfully operative embodiment of the present invention and that comparable and equivalent modifications thereof may be made without departing from the scope of the present invention.

What I claim is:

1. A relative pressure measuring device comprising the combination of a heavy and inflexible base plate, a hollow cylindrical housing closed at one end and its opposite end terminating in an edge portion engaging the base plate in fluid sealing relation therewith, a flexure frame positioned within the housing and with one first heavy and stiff ring end immovably secured to the base plate and continuing integrally and in a direction normal to the ring end in a rigidly stiff first segment skirt and continuing integrally in a direction normal to the first segment skirt on each diametrical side thereof in a pair of flexible beams axially spaced from each other and both pairs of beams continuing integrally in a direction parallel to the first ring end from the first segment skirt to a second rigidly stiff segment skirt and the second segment skirt continuing integrally in a direction parallel to the first ring in a rigidly stiff flexure frame arm remote on the flexure frame from the first ring end, an inflatable bellows within the flexure frame with one bellows end attached to the ring end and the other bellows end attached to the flexure frame arm and with the bellows adapted for flexing the flexible beams of the flexure frame, and flexure indicating means on the flexure frame flexible beams for indicating in sense and in magnitude flexure forces impressed on the flexure frame by the bellows in deforming the flexure frame in response to fluid pressure differences between the pressure inside the bellows and the pressure inside the housing and outside the bellows.

2. An off-axis force component loss minimizing fluid pressure transducer of the strain gauge type comprising a rigidly stiff base plate that is in part threaded along its periphery, a hollow cylindrical housing having a closed end remote from an open end which is threaded internally for engaging the threads on the base plate in fluid sealing engagement therewith, a housing pressure connection opening from outside the assembly into the interior of the housing, a flexure frame within the housing, one rigidly stiff ring end of the flexure frame secured to the base plate, a first rigidly stiff segment skirt structurally continuously integral with the rigidly stiff ring end of the flexure frame and rising axially therefrom, a first pair of axially spaced flexible and circumferentially arcuate beam members that are structurally continuously integral with the first segment skirt and that extend circumferentially away from the first segment skirt, a second pair of axially spaced flexible and circumferentially arcuate beam members that are structurally continuously integral with the first segment skirt and that extend circumferentially away from the edge of the first segment skirt circumferentially remote from the first pair of flexible beam members, a second rigidly stiff segment skirt structurally continuously integral with both the first and the second pairs of flexible beam members at their ends remote from the first segment skirt, a rigidly stiff flexure frame arm that is structurally continuously integral with the second segment skirt and that is remote axially from the rigidly stiff ring end of the flexure frame, an axially extensible bellows within the flexure frame with one bellows end secured to the base plate secured ring in fluid sealing engagement with the base plate secured ring and the bellows having an end remote from the ring and that is secured to the arm end of the flexure frame remote from the base plate ring in fluid sealing engagement therewith, a bellows pressure connection opening from outside the assembly into the interior of the bellows, a plurality of strain gauges attached to the flexure frame beam portions and flexing with the flexing of the flexure frame beam portions, and leads leading from the strain gauges on the flexure frame to outside the assembly for the conduction of strain gauge signal indicating the relative magnitude of pressure to which fluids are subjected within the housing and within the bellows.

3. An off-axis force component loss minimizing fluid pressure transducer device of the strain gauge type comprising a rigidly stiff base plate that is in part threaded along its periphery, an annular flange on said base plate adjacent its threaded part, a hollow housing threadingly engaging said threaded part and having an edge abutting the flange adjacent said threaded part and closed upwardly therefrom, a bellows mounted upon and opening through the base plate, and a flexure frame inside of the housing and outside of the bellows and which flexure frame is a structurally continuous single member which comprises as functionally distinct parts thereof a substantially circular lowermost stiff ring portion by means of which the flexure frame is attached to the device base plate, a first stiff and inflexible segment skirt portion extending from the lowermost ring portion axially of the flexure frame in stiff and firmly supported manner therefrom, a pair of substantially circular flexible beam portions on each diametrically opposite side of the flexure frame and supported from the first segment skirt portion in axially spaced and substantially parallel relation with each other and with the lowermost ring portion, a second segment skirt portion supported by the pair of circular beam portions on their diametrical side remote from the first segment skirt portion, and an uppermost stiff arm portion extending from the second segment skirt portion in stiff and firmly supported manner therefrom and the arm portion secured to the end of the bellows remote from the device base plate.

4. An off-axis force component loss minimizing fluid pressure transducer of the strain gauge type containing two substantially concentric cylindrical fluid compartments and comprising the combination of a rigidly stiff base plate having a flange, a hollow cylindrical open mouthed housing closed at one end and with its mouth engaging the base plate flange in fluid sealing relation with the base plate, a single integral flexure frame disposed within the housing, an inflexible rigidly stiff ring lower portion of the flexure frame, means securing the inflexible ring lower portion of the flexure frame to the base plate adjacent the flange thereof, a first rigidly stiff integral skirt portion of the flexure frame supported by the inflexible ring portion, a pair of substantially parallel and circular beam portions of the flexure frame integrally connecting both diametrically opposite sides of the first skirt portion and supported by the first skirt portion of the flexure frame and extending substantially normally from the first skirt portion of the flexure frame, a second rigidly stiff integral skirt portion of the flexure frame supported by the pair of beam portions of the flexure frame and laterally remote from the first skirt portion of the flexure frame, a rigidly stiff arm upper portion of the flexure frame supported by and integral with the second skirt portion of the flexure frame, an axially extensible bellows secured within the flexure frame with the bellows upper end attached to the flexure frame stiff arm upper portion in fluid sealing engagement therewith and the bellows lower end attached to the base plate in fluid sealing engagement therewith, a bellows connecting tube connecting the inside of the bellows to outside of the assembly, a housing connecting tube connecting the inside of the housing to outside of the assembly, strain gauge means actuated by and mounted adjacent both ends of each of the beam portions of the flexure frame, and strain gauge leads connecting the strain gauge means to outside of the assembly.

References Cited in the file of this patent

UNITED STATES PATENTS

| | | |
|---|---|---|
| 2,360,886 | Osterberg | Oct. 24, 1944 |
| 2,398,372 | Green | Apr. 16, 1946 |
| 2,423,609 | Middleton et al. | July 8, 1947 |
| 2,494,621 | Jones | Jan. 17, 1950 |